(12) United States Patent
Cho

(10) Patent No.: US 12,030,793 B2
(45) Date of Patent: Jul. 9, 2024

(54) PORTABLE HYDROGEN-WATER MIST SPRAYER

(71) Applicant: Seung Hyun Cho, Seongnam-si (KR)

(72) Inventor: Seung Hyun Cho, Seongnam-si (KR)

( * ) Notice: Subject to any disclaimer, the term of this patent is extended or adjusted under 35 U.S.C. 154(b) by 327 days.

(21) Appl. No.: 17/603,740

(22) PCT Filed: Oct. 4, 2019

(86) PCT No.: PCT/KR2019/013076
§ 371 (c)(1),
(2) Date: Oct. 14, 2021

(87) PCT Pub. No.: WO2021/020647
PCT Pub. Date: Feb. 4, 2021

(65) Prior Publication Data
US 2022/0242758 A1    Aug. 4, 2022

(30) Foreign Application Priority Data

Jul. 30, 2019  (KR) .................. 10-2019-0092736

(51) Int. Cl.
*C02F 1/461* (2023.01)
*B05B 11/00* (2023.01)

(52) U.S. Cl.
CPC ...... *C02F 1/46109* (2013.01); *B05B 11/0039* (2018.08); *C02F 2201/4616* (2013.01)

(58) Field of Classification Search
CPC ........... C02F 1/4618; C02F 2001/4619; B05B 11/0039
See application file for complete search history.

(56) References Cited

U.S. PATENT DOCUMENTS

| | | | |
|---|---|---|---|
| 6,189,739 B1* | 2/2001 | von Schuckmann | ................. B05B 11/1059 222/321.6 |
| 2009/0314658 A1* | 12/2009 | Field | ................. B08B 3/08 204/263 |

(Continued)

FOREIGN PATENT DOCUMENTS

| JP | 2011-104806 A | 6/2011 |
|---|---|---|
| KR | 10-1728010 B1 | 4/2017 |

(Continued)

*Primary Examiner* — Ciel P Contreras
(74) *Attorney, Agent, or Firm* — PARK LAW FIRM

(57) ABSTRACT

The present invention relates to a portable hydrogen water mist sprayer comprising a water container which has an open-top coupling part protruding from the top center, a central case, the bottom of which becomes coupled to the top of the water container, and a top cap that becomes coupled to the top of the central case, and wherein an enclosed installation frame placed in the bottom of the central case and the bottom of the central case, which becomes coupled and fixed to the bottom of the central case, are coupled to the open-top coupling part of the water container for airtightness, and an airtightness frame that has a discharge guide groove and a discharge guide hole to selectively release the gas from hydrogen water production inside the water container is applied so that, in case the internal pressure of the water container exceeds a certain level, the gas from inside the water container can flow through the enclosed installation frame and airtightness frame and be discharged outside via the discharge guide groove and discharge guide hole. Accordingly, in case the internal pressure of the water container exceeds a certain level, infiltration of gas containing hydrogen components and/or water molecules into the electrical components involved in hydrogen production, such as the control unit, can be prevented, and the gas is (Continued)

1000 discharged outside so as to substantially improve the safety and durability of the mist spraying device.

9 Claims, 8 Drawing Sheets

(56) References Cited

U.S. PATENT DOCUMENTS

2013/0112771 A1* 5/2013 Ki ................... B05B 17/0646
239/102.2
2015/0291453 A1* 10/2015 Kim ................... C02F 1/4618
204/252

FOREIGN PATENT DOCUMENTS

| KR | 10-1783366 | B1 | 9/2017 |
| KR | 10-1909102 | B1 | 10/2018 |
| KR | 20-0487890 | Y1 | 11/2018 |

* cited by examiner (Prior Art)

PORTABLE HYDROGEN-WATER MIST SPRAYER

TECHNICAL FIELD

The present invention relates to a portable hydrogen water mist sprayer, which, more specifically, comprises a water container which has an open-top coupling part protruding from the top center, a central case, the bottom of which becomes coupled to the top of the water container, and a top cap that becomes coupled to the top of the central case, and wherein an enclosed installation frame placed in the bottom of the central case and the bottom of the central case, which becomes coupled and fixed to the bottom of the central case, are coupled to the open-top coupling part of the water container for airtightness, and an airtightness frame that has a discharge guide groove and a discharge guide hole to selectively release the gas from hydrogen water production inside the water container is applied so that, in case the internal pressure of the water container exceeds a certain level, the gas from inside the water container can flow through the enclosed installation frame and airtightness frame and be discharged outside via the discharge guide groove and discharge guide hole. Accordingly, in case the internal pressure of the water container exceeds a certain level, infiltration of gas containing hydrogen components and/or water molecules into the electrical components involved in hydrogen production, such as the control unit, can be prevented, and the gas is discharged outside so as to substantially improve the safety and durability of the mist spraying device.

BACKGROUND ART

In general, hydrogen water mist refers to microdroplets of water wherein there is a large amount of dissolved hydrogen in a gaseous state.

Hydrogen water mist, which has an antioxidant effect in that the dissolved hydrogen eliminates hydroxyl radials, has been reported to help prevent aging, diabetes, hypertension, arteriosclerosis, cancer, and dementia, promote skin health, weight loss, recovery from fatigue, exercise capacity, the immune system, and hangover relief, and be effective against indigestion and excessive stomach acid secretion.

As a prior art related to a portable hydrogen water mist sprayer that can be used by spraying hydrogen water mist as described above, an ultrasonic hydrogen water mist, as shown in Patent Document 1 (Korean Patent Registration No. 10-1728010, Registered on Apr. 12, 2017), has been launched.

FIG. 1 is an exemplary drawing of an ultrasonic hydrogen water generator according to the prior art.

Referring to FIG. 1, the prior art related to a portable hydrogen water mist sprayer that can be used by spraying hydrogen water mist includes a container unit for holding water; a hydrogen generator, which is coupled to the bottom of said container unit, generates hydrogen to convert the water held in the container unit into hydrogen water by the hydrogen generating unit, and supplies the hydrogen water generated into the container unit; and a spray unit coupled to the top of said container unit, receives the hydrogen water held in the container unit, and makes the hydrogen water into a mist form by a built-in ultrasonic vibrator.

At this time, said container part has a body, which has an opening at the top and bottom each, and said spray unit is coupled to one side of the body of said container unit by a hinge shaft at the top of a channel extending vertically.

Also, the hydrogen generating unit has a housing, which has an opening at the top and bottom each, the bottom opening is covered by a finishing plate, and a control module for controlling the operation of said hydrogen generating unit is attached to said finishing plate.

The ultrasonic hydrogen generator, a prior art related to a portable hydrogen water mist sprayer that can be used by spraying hydrogen water mist as described above, had an issue in that water seeped from the water container and into the electronic components for hydrogen production in the hydrogen generating unit due to gravitational force, as the hydrogen generating unit was coupled to the bottom of the container unit for holding water, and this caused failures in said electronic components.

As water penetrated the electrical components involved in hydrogen production inside the hydrogen generating unit, it substantially reduced the durability of the device.

Meanwhile, in order to address the aforementioned issues, a portable hydrogen water mist sprayer wherein the hydrogen generating unit, control, module, etc. are placed above the container unit for holding water began to be used.

A portable hydrogen water mist sprayer with said improvements was able to prevent water seepage from the container unit caused by gravitational force, etc. and failures in the electrical components involved in hydrogen production, but when the internal pressure exceeded a certain level as a result of hydrogen water production in the container unit, the gas containing hydrogen components and water molecules leaked into the electrical components involved in hydrogen production.

Moreover, when the internal pressure exceeded a certain level as a result of hydrogen water production in the container unit and the gas containing hydrogen components and water molecules leaked into the electrical components involved in hydrogen production, it substantially reduced the durability of the device.

In addition, when the internal pressure exceeded a certain level as a result of hydrogen water production in the container unit, it posed risk of explosion and thus reduced the safety of the device.

Therefore, there is a need to conduct research and develop a portable hydrogen water mist sprayer wherein penetration of gas containing hydrogen components and water molecules into the electrical components involved in hydrogen production can be prevented, even when the internal pressure of the container exceeds a certain level, through which device safety and durability can be substantially improved.

[Literature on Prior Art]
(Patent Document 1) Korean Patent Registration No. 10-1728010, Registered on Apr. 12, 2017
(Patent Document 2) Korean Public Patent No. 2017-0119475, Made public on Oct. 27, 2017
(Patent Document 3) Korean Public Patent No. 2018-0065616, Made public on Jun. 18, 2018
(Patent Document 4) Korean Utility Model Registration No. 20-0487890, Registered on Nov. 12, 2018

DISCLOSURE OF INVENTION

Technical Issues

In order to address the above issues, the present invention aims to provide a portable hydrogen water mist sprayer, which comprises a water container which has an open-top coupling part protruding from the top center, a central case, the bottom of which becomes coupled to the top of the water container, and a top cap that becomes coupled to the top of the central case, and wherein an enclosed installation frame placed in the bottom of the central case and the bottom of the central case, which becomes coupled and fixed to the bottom of the central case, are coupled to the open-top coupling part of the water container for airtightness, and an airtightness frame that has a discharge guide groove and a discharge guide hole to selectively release the gas from hydrogen water production inside the water container is applied so that, in case the internal pressure of the water container exceeds a certain level, the gas from inside the water container can flow through the enclosed installation frame and airtightness frame and be discharged outside via the discharge guide groove and discharge guide hole.

Also, another object of the technology according to the present invention is to prevent infiltration of gas containing hydrogen components and/or water molecules into the electrical components involved in hydrogen production, such as the control unit, by guiding gas from inside the water container to flow through the enclosed installation frame and airtightness frame and be discharged outside via the discharge guide groove and discharge guide hole.

In addition, another object of the technology according to the present invention is to substantially improve the safety and durability of the mist spraying device through the prevention of infiltration of gas containing hydrogen components and/or water molecules into the electrical components involved in hydrogen production, such as the control unit, by guiding gas from inside the water container to flow through the enclosed installation frame and airtightness frame and be discharged outside via the discharge guide groove and discharge guide hole.

Means to Address the Issues

The present invention for achieving the above objects is as follows: That is, a portable hydrogen water mist sprayer according to the present invention is a portable hydrogen water mist sprayer for spraying hydrogen water in a mist state after it is generated by electrolysis of water that comprises a water container which has an open-top coupling part with an L-shaped inward protrusion near the top, holds water inside, and is situated at the bottommost part, a central case which has a through-hole in the center, has an installation space at the bottom of the through-hole, has an opening at the bottom, and has the bottom coupled to the top of said water container, and a top cap that covers the top of said central case forming the exterior; and contains an enclosed installation frame which is placed upward from the bottom of said central case to seal the installation space of said central case and wherein a sealing protrusion protrudes as a ring type from the bottom center and an 0-ring gets fixed to the outer side of the sealing protrusion; a control unit which is placed in the installation space of said central case, which is the top part of said enclosed installation frame, and controls the device operation for hydrogen production; an airtightness frame which is fixed to the bottom of said enclosed installation frame to maintain airtightness between the bottom of the open installation space of said central case and the internal space of said water container, and wherein the top surrounds the sealing protrusion of said enclosed installation frame and a sealing member is fixed to the base so that it comes into close contact with the top of the coupling part of the water container through the sealing member, the inner bottom becomes coupled to the coupling part of said water container with screws and the bottom of said central case gets coupled and fixed to the top of said water container, and which, in case the internal pressure of said water container exceeds a certain level, guides the gas containing hydrogen components and water molecules from the inside of the water container through the side that is contact with the 0-ring of said enclosed installation frame and to the outside; a battery unit which can be selectively detached from one side of the top of the control unit of said central case and supplies power to said control unit to operate and control the device; electrodes, which are selectively supplied power from said control unit to have opposite polarity and run as a pair along the circumference of the sealing protrusion of said enclosed installation frame to a certain length downward, which are placed inside at the bottom of said water container, and which are spaced apart in the form of a coil at the bottom to generate hydrogen through ionization and breakdown of water molecules from inside the water container; a suction tube which penetrates in the vertical direction through the central part of said enclosed installation frame, suctions the hydrogen water from inside the water container that was generated from the hydrogen produced as a result of ionization and breakdown of water molecules caused by the opposite polarity of the bottom of said electrodes, and guides the hydrogen water upward; a tube guide which surrounds the lower area of said enclosed installation frame of said suction tube; electrode guides which surround the pair of electrodes, with opposite polarity from both sides of said tube guide; and a spray unit, the center of the bottom of which is connected to the top of said suction tube and which selectively sprays hydrogen water that is suctioned and guided from said suction tube.

Here, in order for the gas containing hydrogen components and water molecules from inside the water container to be guided and discharged to the outside through the side in contact with the O-ring of said enclosed installation frame when the internal pressure of the water container exceeds a certain level, it is desirable for said airtightness frame to have a gas discharge guide groove, which extends along the circumference on the top side opposite to said sealing member, and a gas discharge guide hole, which penetrates from one side of said gas discharge guide groove downward to the bottom to discharge gas to the outside.

At this time, in order for the gas guided into said gas discharge guide groove to be prevented from entering the installation space, it is preferable for said airtightness frame to have an airtightness ring installed and for the upper circumference of said airtightness frame to be kept in close contact with the bottom of the outer side of the sealing protrusion of the enclosed installation frame by said airtightness ring.

Also, in order for the gas containing hydrogen components and water molecules from inside the water container to be guided and discharged to the outside past the area where the O-ring, which is fixed to the outer surface of the sealing protrusion of the enclosed installation frame, and the airtightness frame are in close contact when the internal pressure of the water container exceeds a certain level, it is desirable for the O-ring of said enclosed installation frame to be characterized by a groove formed by a depression to a certain extent from the middle of the top side toward the center and retract inward due to the gas pressure to guide the gas from inside the water container to the outside via the groove.

In addition, it is preferable for said battery unit to comprise an external case (510) which can be selectively detached from one side at the top of the control unit (300) of said central case (120) with a part of the arc on one side of the upper part of said central case (120) is partitioned; an internal case which is fixed to the inside of said external case by one side in the form of a housing where one side is open;

a battery which is fixed to the inside of said internal case; and an internal case cover which covers the open part of the internal case.

At this time, it is desirable for said battery to be provided as a rechargeable battery.

Further, it is preferable for there to be a charging socket on the bottom of the side from which said battery unit of said central case is detached in order for the battery inside said battery unit to be provided as a rechargeable battery and be used after being charged.

Also, it is desirable for there to be a bottom cover which is coupled and fixed to the bottom of the water container to surround the water container and which is made of rubber or silicone to prevent slipping when it is placed on a surface.

Moreover, it is preferable for said electrode guides to comprise an upper electrode guide which surrounds the vertical type part of said electrodes; a lower electrode guide which is connected to a certain extent to the bottom of both sides of said tube guide and through which the coil type part at the bottom end of the electrodes penetrates and is supported by said lower electrode guide; and a lower auxiliary electrode guide which protrudes outward to a certain extent from the bottom of both sides of the tube guide intersecting said lower electrode guide perpendicularly and through which the coil type part at the bottom end of the electrodes penetrates and is provided 4-point support in combination with the lower electrode guide.

Effects of the Invention

The effects of a portable hydrogen water mist sprayer according to the present invention can be described as follows:

First, it comprises a water container which has an open-top coupling part protruding from the top center, a central case, the bottom of which becomes coupled to the top of the water container, and a top cap that becomes coupled to the top of the central case. An enclosed installation frame placed in the bottom of the central case and the bottom of the central case, which becomes coupled and fixed to the bottom of the central case, are coupled to the open-top coupling part of the water container for airtightness, and an airtightness frame that has a discharge guide groove and a discharge guide hole to selectively release the gas from hydrogen water production inside the water container is applied so that, in case the internal pressure of the water container exceeds a certain level, the gas from inside the water container can flow through the enclosed installation frame and airtightness frame and be discharged outside via the discharge guide groove and discharge guide hole.

Second, infiltration of gas containing hydrogen components and/or water molecules into the electrical components involved in hydrogen production, such as the control unit, can be prevented by guiding gas from inside the water container to flow through the enclosed installation frame and airtightness frame and be discharged outside via the discharge guide groove and discharge guide hole.

Third, the safety and durability of the mist spraying device can be substantially improved through the prevention of infiltration of gas containing hydrogen components and/or water molecules into the electrical components involved in hydrogen production, such as the control unit, by guiding gas from inside the water container to flow through the enclosed installation frame and airtightness frame and be discharged outside via the discharge guide groove and discharge guide hole.

BEST MODES FOR CARRYING OUT THE INVENTION

Hereinafter, a preferred embodiment of a portable hydrogen water mist sprayer according to the present invention will be described in detail with reference to the accompanying drawings.

Figure 1:
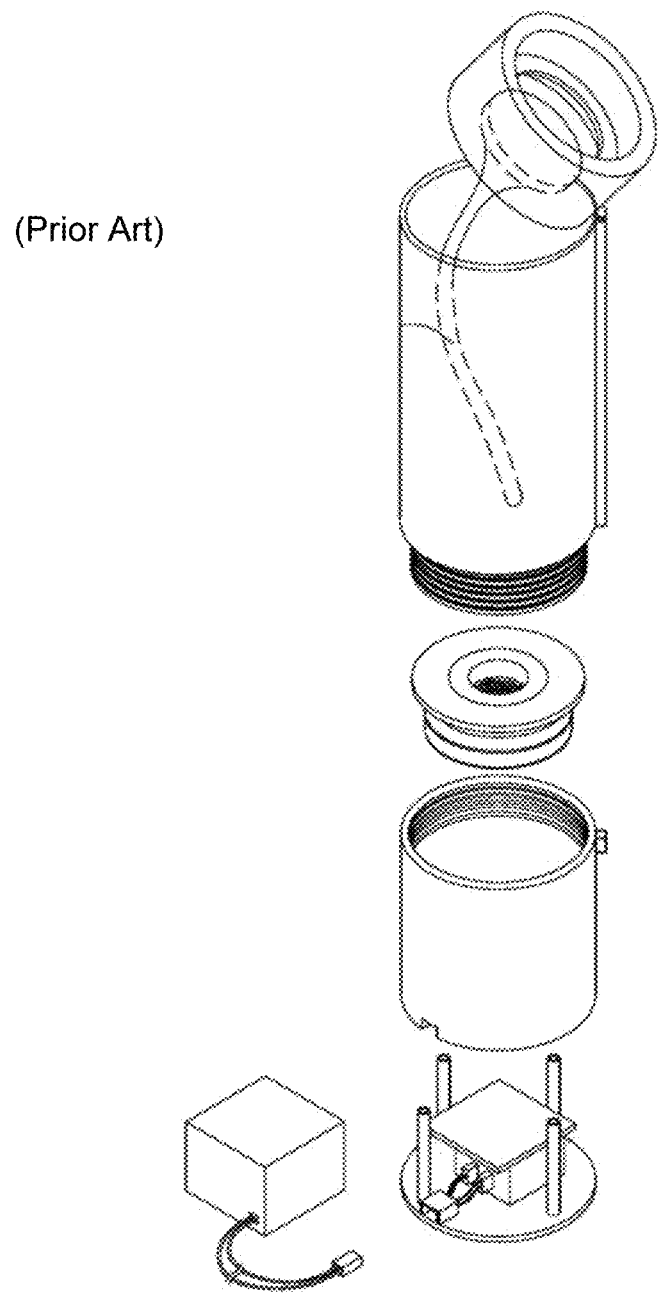
FIG. 1 is an exemplary view of an ultrasonic hydrogen water generator according to the prior art.
Figure 2:
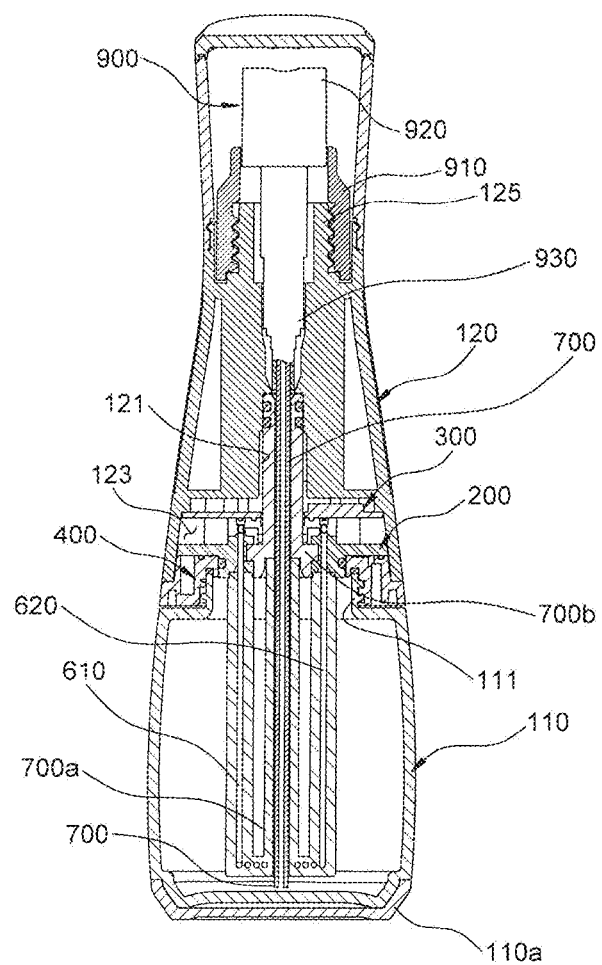
FIG. 2 is a cross-sectional view of the assembly of a portable hydrogen water mist sprayer according to the present invention.
Figure 3:
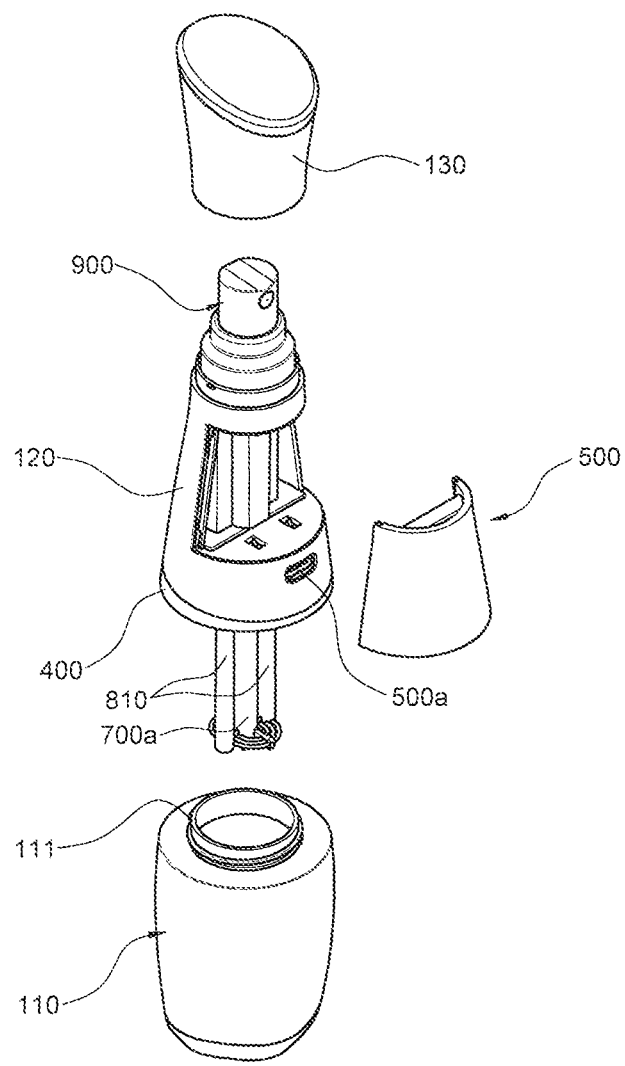
FIG. 3 is a partial perspective view of a portable hydrogen water mist sprayer according to the present invention.
Figure 4:
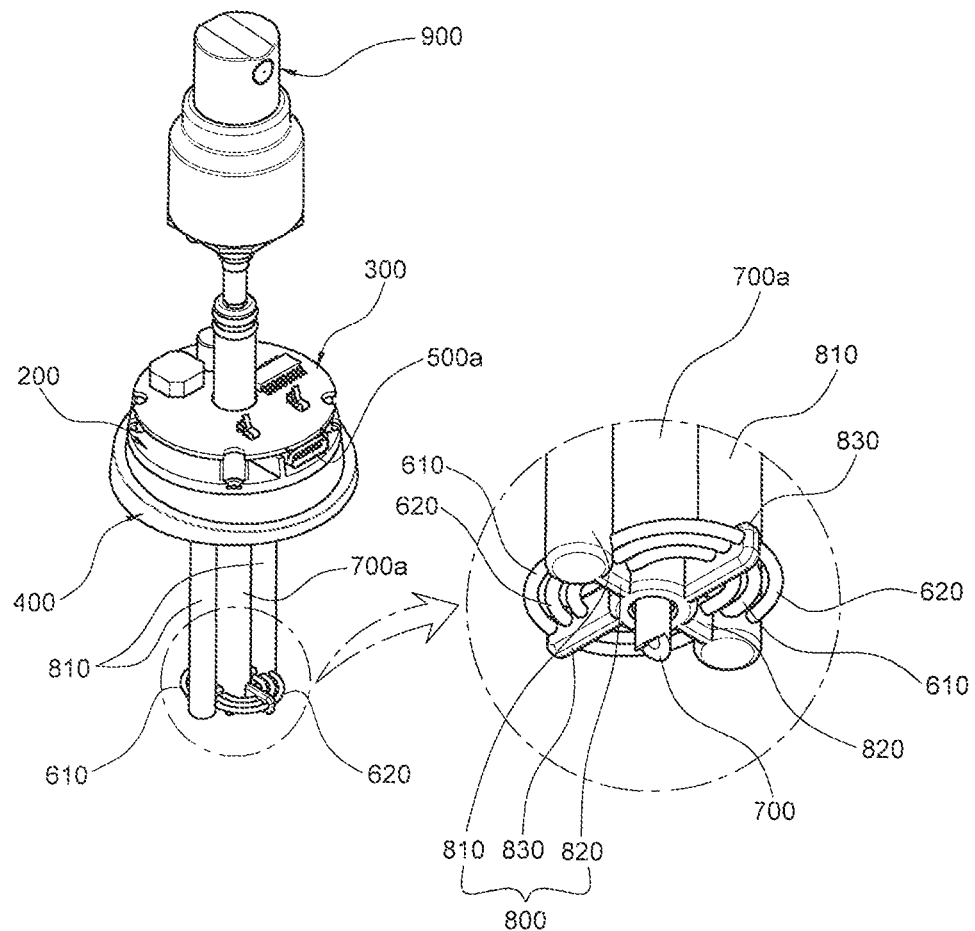
FIG. 4 is a partial perspective view of a portable hydrogen water mist sprayer according to the present invention from which water container, top cap, and central case, which are main parts, are removed.

FIG. 2 is a cross-sectional view of the assembly of a portable hydrogen water mist sprayer according to the present invention, FIG. 3 is a partial perspective view of a portable hydrogen water mist sprayer according to the present invention, and FIG. 4 is a partial perspective view of a portable hydrogen water mist sprayer according to the present invention from which water container, top cap, and central case, which are main parts, are removed.

Figure 5A:
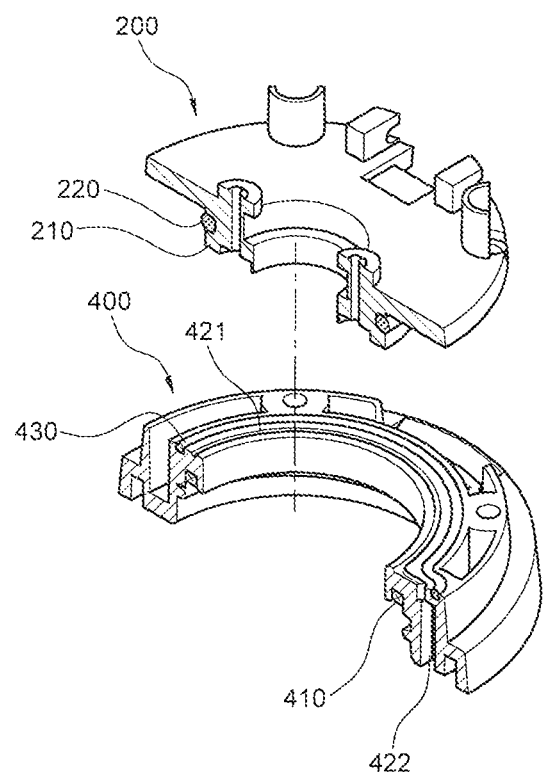
FIGS. 5a and 5b are perspective views of the enclosed installation frame and airtightness frame, which are main parts of a portable hydrogen water mist sprayer according to the present invention.
Figure 5B:
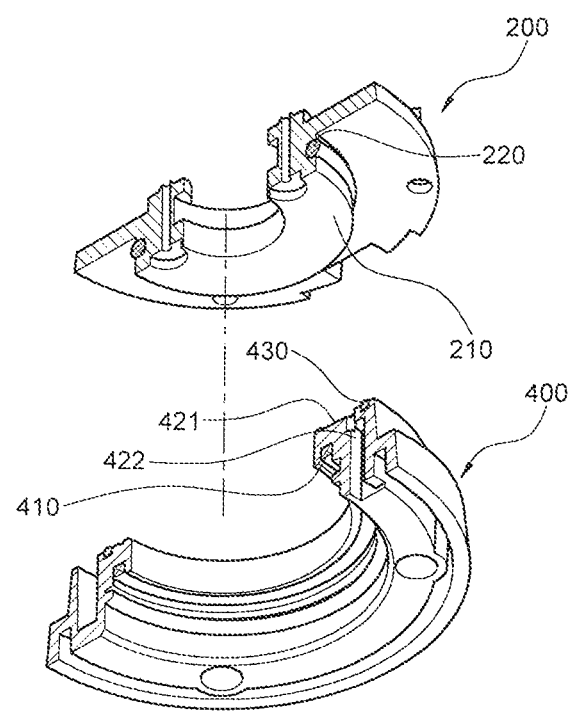
Figure 6:
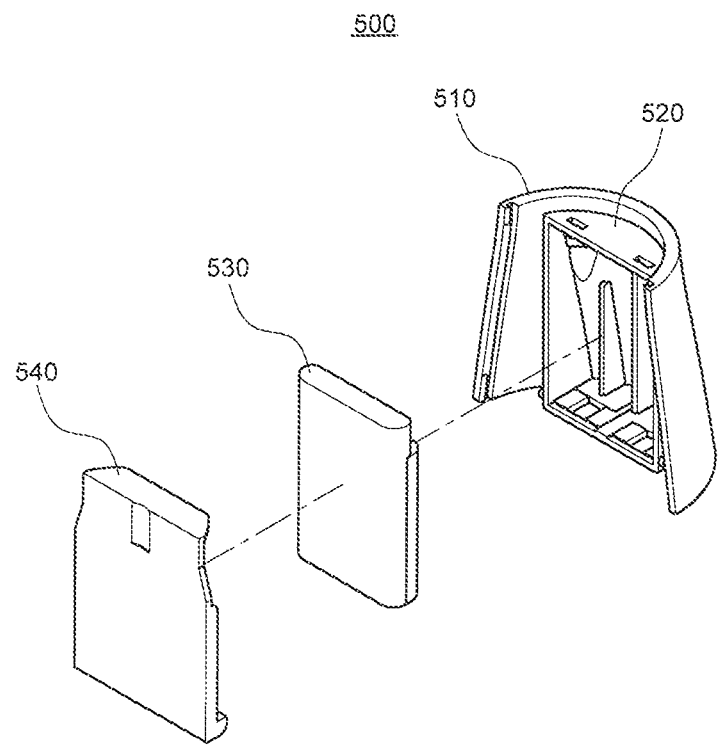
FIG. 6 is a perspective view of the battery unit, which is a main part of a portable hydrogen water mist sprayer according to the present invention.

FIGS. 5a and 5b are perspective views of the enclosed installation frame and airtightness frame, which are main parts of a portable hydrogen water mist sprayer according to the present invention, and FIG. 6 is a perspective view of the battery unit, which is a main part of a portable hydrogen water mist sprayer according to the present invention.

Figure 7:
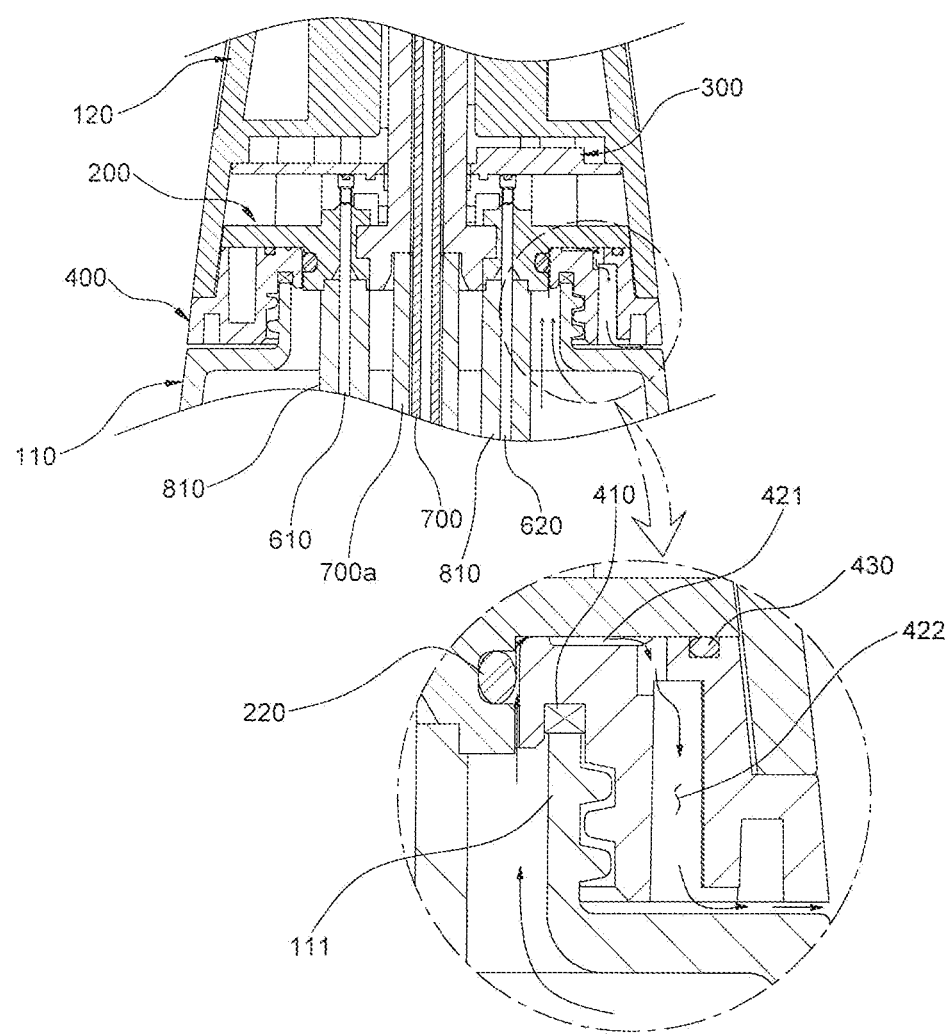
FIG. 7 is a drawing of an embodiment of a portable hydrogen water mist sprayer according to the present invention that shows how the gas is discharged to the outside when the pressure inside the water container exceeds a certain level so that the internal pressure can be lowered.

FIG. 7 is a drawing of an embodiment of a portable hydrogen water mist sprayer according to the present invention that shows how the gas is discharged to the outside when the pressure inside the water container exceeds a certain level so that the internal pressure can be lowered.

As shown in FIGS. 2 through 7, a portable hydrogen water mist sprayer (1000) according to a preferred embodiment of the present invention is a device which sprays hydrogen water in a mist state after it is generated by electrolysis of water, comprises a water container (110), central case (120), and top cap (130) forming the exterior, and contains an enclosed installation frame (200), control unit (300), airtightness frame (400), battery unit (500), electrodes (610, 620), suction tube (700), tube guide (700a), electrode guides (800), and spray unit (900).

More specifically, a portable hydrogen water mist sprayer (1000) according to the present invention comprises a water container (110) which has an open-top coupling part (111) with an L-shaped inward protrusion near the top, holds water inside, and is situated at the bottommost part, a central case (120) which has a through-hole (121) in the center, has an installation space at the bottom of the through-hole, has an opening at the bottom, and has the bottom coupled to the top of said water container (110), and a top cap (130) that covers the top of said central case (120).

Also, said enclosed installation frame (200) is placed upward from the bottom of said central case (120) to seal the installation space (123) of said central case (120), a sealing protrusion (210) protrudes as a ring type from the bottom center, and an O-ring (220) gets fixed to the outer side of the sealing protrusion (210).

It is desirable for the enclosed installation frame (200) as above to contain a through-hole (no assigned code) of a certain size in the center for the suction tube (700) to be installed through it.

Also, said control unit (300) is placed in the installation space (123) of said central case (120), which is the top part of said enclosed installation frame (200), and controls the device operation for hydrogen production.

It is desirable for the control unit (300), in particular, to be provided as a PCB module type that includes a printed circuit board (PCB), etc.

Meanwhile, said airtightness frame (400) is fixed to the bottom of said enclosed installation frame (200) to maintain airtightness between the bottom of the open installation space (123) of said central case (120) and the internal space of said water container (110), the top of the airtightness frame (400) surrounds the sealing protrusion (210) of said enclosed installation frame (200), and a sealing member (410) is fixed to the base so that it comes into close contact with the top of the coupling part (111) of the water container (110) through the sealing member.

Moreover, the inner bottom of said airtightness frame (400) becomes coupled to the coupling part (111) of said water container (110) with screws and the bottom of said central case (120) gets coupled and fixed to the top of said water container (110) so that, in case the internal pressure of said water container (110) exceeds a certain level, the gas containing hydrogen components and water molecules from the inside of the water container (110) can be guided through the side that is contact with the O-ring (220) of said enclosed installation frame (220) and to the outside.

At this time, the internal pressure of the water container (110) exceeding a certain level means a pressure level exceeding 1.0 kg f/cm$^2$ of due to a malfunction, etc., even though the pressure arising from hydrogen water production inside the water container (110) is normally controlled by the control unit (300) to be maintained in the range of 0.8 kg f/cm$^2$ to 1.0 kg f/cm$^2$ inside the water container (110).

In other words, said airtightness frame (400) is controlled by the control unit (300) so that, in case the pressure arising from hydrogen water production inside the water container (110) exceeds to 1.0 kg f/cm$^2$ due to a malfunction, etc., the gas containing hydrogen components and water molecules from inside the water container (110) is guided to the outside through the area where the enclosed installation frame (200) and O-ring (220) are in close contact and the pressure inside the water container (110) can be lowered from levels above normal.

In addition, it is desirable for the airtightness frame (400) described above and said enclosed installation frame (200) to be mutually fixed to each other through a fastening means (not shown) such as bolts, etc.

Moreover, it is desirable for said control unit to be installed at the top of said airtightness frame (400).

Meanwhile, said battery unit (500) can be selectively detached from one side of the top of the control unit (300) of said central case (120) and supplies power to said control unit (300) to operate and control the device.

Also, said electrodes (610, 620) are selectively supplied power from said control unit (300) to have opposite polarity, run as a pair along the circumference of the sealing protrusion (210) of said enclosed installation frame (200) to a certain length downward, and are placed inside at the bottom of said water container (110).

It is desirable for the bottom of these electrodes (610, 620), in particular, to be spaced apart in the form of a coil at the bottom to generate hydrogen through ionization and breakdown of water molecules from inside the water container (110).

Also, said suction tube (700) penetrates in the vertical direction through the central part of said enclosed installation frame (200), suctions the hydrogen water from inside the water container (110) that was generated from the hydrogen produced as a result of ionization and breakdown of water molecules caused by the opposite polarity of the bottom of said electrodes (610, 620), and guides the hydrogen water upward.

Also, said tube guide (700*a*) surrounds the lower area of said enclosed installation frame (200) of said suction tube.

Moreover, an upper tube guide (700*b*) may be additionally installed around the top part of the suction tube (700) at the top of the tube guide (700*a*) described above.

At this time, the bottom of said upper tube guide (700*b*), as shown in FIG. 2, connects to the central part of the enclosed installation frame (200) and the top of said upper tube guide (700*b*) is inserted for installation so that it reaches the part with an inward protrusion a certain length up from the bottom of the through-hole (121) which leads upward from the installation space (123) of said central case (120); and it is desirable for an O-ring (no assigned code) to be installed on the outer surface of the side of the top part.

Also, said electrode guides (800) surround the pair of electrodes (610, 620) with opposite polarity from both sides of said tube guide (700*a*).

Also, the center of the bottom of said spray unit (900) is connected to the top of said suction tube (700) and selectively sprays hydrogen water that is suctioned and guided from said suction tube (700).

To the spray unit (900) described above, a spray structure to which the top of the suction tube is connected from the bottom of the spray pump is applied, and although it is not shown in the drawings, it largely comprises a body (910), spray cap (920), and elevation guide (930).

Here, the bottom side of said body (910) is coupled to the top side of top coupling part (125) protruding upward from the center of the top of the central case (120).

Also, said spray cap (920) comprises a spray hole (not shown) in a nozzle, the bottom of the spray cap (920) is put through the center of the top of said body (910) to be inserted to a certain extent, and through pressurization and depressurization against the top of the exterior, the spray cap (920) rises, while being confined inside the body (910), to selectively spray the hydrogen water suctioned in through the suction tube (700) to the outside as a mist type through the spray hole (not shown).

Also, said elevation guide (930) is inserted upward from the bottom of said spray cap (92) to a certain extent and the top of the upward suction tube (700) is inserted from the bottom to a certain extent in order to guide the hydrogen water suctioned in through the suction tube (700) to the spray hole of the spray cap (920) to be sprayed out, and, at the same time, an elastic member (not shown), etc. inside provides elastic resilience through which the spray cap (920)

rises to the original height after being lowered to a certain extent when pressure is applied to and lifted from said spray cap (920).

MODES FOR CARRYING OUT THE INVENTION

The components of the elastic member (not shown), etc. in the spray unit (900) comprising the components described above are not specifically illustrated for an explanation, but it is identical to the typical structure used to spray the content from a spray pump, and thus a detailed explanation will be omitted.

Meanwhile, it is important for a portable hydrogen water mist sprayer (1000) according to the present invention that comprises the components described above to guide the gas containing hydrogen components and water molecules from the inside of the water container (110) through the side that is contact with the O-ring (220) of said enclosed installation frame (200) and to the outside when the internal pressure of said water container (110) exceeds a certain level.

To this end, it is desirable for said airtightness frame (400) to have a gas discharge guide groove (421) which extends along the circumference on the top side opposite to said sealing member (410) and a gas discharge guide hole (422) which penetrates from one side of said gas discharge guide groove (421) downward to the bottom to discharge gas to the outside.

Moreover, it is important for said airtightness frame (400) to prevent the gas guided into said gas discharge guide groove (421) from entering the installation space (123) of the central case (120).

Therefore, it is desirable for said airtightness frame (400) to have an airtightness ring (430) installed on the outer side wherein said gas discharge guide groove (421) is formed and for the upper circumference of said airtightness frame (400) to be kept in close contact with the bottom of the outer side of the sealing protrusion (210) of the enclosed installation frame (200) by said airtightness ring (430).

Also, it is important for a portable hydrogen water mist sprayer (1000) according to the present invention that comprises the components described above to guide the gas containing hydrogen components and water molecules from the inside of the water container (110) to the outside past the area where the O-ring (220), which is fixed to the outer surface of the sealing protrusion (210) of the enclosed installation frame (200), and the airtightness frame (400) are in close contact when the internal pressure of the water container (110) exceeds a certain level.

To this end, as another embodiment that is not specifically shown in the drawings, the O-ring of said enclosed installation frame (200) has a groove (not shown) formed by a depression of a certain area from the middle of the top side toward the center and retracts inward due to the gas pressure to guide the gas from inside the water container to the outside via the groove. (not shown).

Meanwhile, said battery unit (500) of a portable hydrogen water mist sprayer (1000) according to the present invention that comprises the components described above largely comprises an external case (510), internal case (520), battery (530), and internal case cover (540).

More specifically, said external case (510) can be selectively detached from one side at the top of the control unit (300) of said central case (120) with a part of the arc on one side of the upper part of said central case (120) is partitioned.

Also, said internal case (520) is fixed to the inside of said external case (510) in the form of a housing where one side is open.

Additionally, said battery (530) is fixed to the inside of said internal case (520).

It is desirable for the battery (530), in particular, to be provided as a rechargeable battery.

Also, said internal case cover (54) covers the open part of the internal case (520) with the battery (530) placed inside said internal case (520).

Additionally, it is important to provide the battery (530) inside said battery unit (500) as a rechargeable battery as described above so that it can be selectively charged and used.

Accordingly, it is more desirable for there to be a charging socket (500a) on the bottom of the side from which said battery unit (500) of said central case (12) can be detached.

Meanwhile, it is desirable for a portable hydrogen water mist sprayer (1000) according to the present invention that comprises the components described above to further comprise a bottom cover (110a) which is coupled and fixed to the bottom of the water container to surround the water container (100).

At this time, it is desirable for said bottom cover (110a) to be made of rubber or silicone to prevent slipping when it is placed on a surface.

Said electrode guides in a portable hydrogen water mist sprayer (1000) according to the present invention that comprises the components described above largely comprises an upper electrode guide (810), lower electrode guide (820), and lower auxiliary electrode guide (830).

Here, said upper electrode guide (810) surrounds the vertical type part of said electrodes (610, 620), and it is desirable for the inside of said upper electrode guide (810) to surround said electrodes (610, 620) within a certain distance from the outer side of said electrodes (610, 620).

Moreover, in the case of the bottom of the upper electrode guide (810), it is desirable for said electrodes (610, 620) to penetrate to the outside, as shown in the drawing, to extend as a coil type.

Also, said lower electrode guide (820) is connected to a certain extent to the bottom of both sides of said tube guide (700a) and through which the coil type part at the bottom end of the electrodes (610, 620) penetrates and is supported by said lower electrode guide (820).

Moreover, said lower auxiliary electrode guide (830) protrudes outward to a certain extent from the bottom of both sides of the tube guide (700a) intersecting said lower electrode guide (820) perpendicularly and through which the coil type part at the bottom end of the electrodes (610, 620) penetrates and is provided 4-point support in combination with the lower electrode guide (820).

As described above, by comprising an upper electrode guide (810), lower electrode guide (820), and lower auxiliary electrode guide (830) as electrode guides (820), the vertical type and coil type can be surrounded and supported, and the pair of electrodes (610, 620) can be kept at a certain distance apart at the bottom of the coil type.

According to a portable hydrogen water mist sprayer (1000) according to the present invention that comprises the components described above, it comprises a water container which has an open-top coupling part protruding from the top center, a central case, the bottom of which becomes coupled to the top of the water container, and a top cap that becomes coupled to the top of the central case. An enclosed installation frame placed in the bottom of the central case and the bottom of the central case, which becomes coupled and fixed to the bottom of the central case, are coupled to the open-top coupling part of the water container for airtightness, and an airtightness frame that has a discharge guide groove and a discharge guide hole to selectively release the gas from hydrogen water production inside the water container is applied so that, in case the internal pressure of the water container exceeds a certain level, the gas from inside the water container can flow through the enclosed installation frame and airtightness frame and be discharged outside via the discharge guide groove and discharge guide hole.

Moreover, infiltration of gas containing hydrogen components and/or water molecules into the electrical components involved in hydrogen production, such as the control unit, can be prevented by guiding gas from inside the water container to flow through the enclosed installation frame and airtightness frame and be discharged outside via the discharge guide groove and discharge guide hole.

Further, the safety and durability of the mist spraying device can be substantially improved through the prevention of infiltration of gas containing hydrogen components and/or water molecules into the electrical components involved in hydrogen production, such as the control unit, by guiding gas from inside the water container to flow through the enclosed installation frame and airtightness frame and be discharged outside via the discharge guide groove and discharge guide hole.

Specific embodiments of the present invention were described in detail above, but the present invention is not limited thereto, and the present invention may be carried out with diverse modifications by a person with ordinary skill in the art to which the present invention pertains and such modifications are included in the scope of the present invention.

[Description of Codes]

1000: Portable hydrogen water mist sprayer
110: Water container 111: Coupling part
110a: Bottom cover 120: Central case
121: Through-hole 123: Installation space
130: Top cap 125: Top coupling part
200: Enclosed installation frame
201: Sealing protrusion 220: O-ring
300: Control unit 400: Airtightness frame
410: Sealing member 421: Gas discharge guide groove
422: Gas discharge guide hole 430: Airtightness ring
500: Battery unit 510: External case
520: Internal case 530: Battery
540: Internal case cover 500a: Charging socket
610, 620: Electrodes 700: Suction tube
700a: Tube guide 700b: Upper tube guide
800: Electrode guides 810: Upper electrode guide
820: Lower electrode guide 830: Lower auxiliary electrode guide
900: Spray unit 910: Body
920: Spray cap 930: Elevation guide

The invention claimed is:

1. A portable hydrogen water mist sprayer (1000) for spraying a hydrogen water in a mist state by electrolysis of water comprising,
   a water container (110) having an open-top coupling part (111) with an L-shaped inward protrusion, wherein the water container (110) is attached to a control unit (300),
   a central case (120) has a through-hole (121), and the central case (120) is coupled with the water container (110);
   the central case (120) also has an enclosed installation frame (200) sealing an installation space (123) of the central case (120), wherein the sealing protrusion (210) protrudes from an O-ring (220) attached to the sealing protrusion (210), and wherein the control unit (300) controlling hydrogen production is placed in the installation space (123) of the central case (120), above the enclosed installation frame (200)
   an airtightness frame (400) attached to the enclosed installation frame (200) maintains airtightness between the open installation space (123) of the central case (120) and the water container (110), and the sealing protrusion (210) and a sealing member (410) of the enclosed installation frame (200) come into contact with the coupling part (111) of the water container (110) so that when an internal pressure of the water container (110) exceeds a pre-determined level, the airtightness frame (400) guides a gas containing hydrogen components and water molecules from the water container (110), through the O-ring (220) of said enclosed installation frame (200), and releases the gas to the outside;
   a battery unit (500) removably attached to the control unit (300) supplies power to the control unit (300);
   electrodes (610, 620), receiving power via the control unit (300) and having opposite polarities and operating as a pair, are placed within the water container (110), wherein the electrodes (610, 620) are spaced apart to generate hydrogen through ionization and breakdown of water molecules within the water container (110);
   a suction tube (700) placed in the enclosed installation frame (200) draws the hydrogen water from the water container (110) containing the hydrogen produced as a result of ionization and breakdown of water molecules caused by the opposite polarity of the electrodes (610, 620), and guides the hydrogen water upward;
   a tube guide (700a) is placed within the enclosed installation frame (200), surrounding the suction tube;
   electrode guides (800) surround are surrounding the pair of electrodes (610, 620) and placed at sides of the tube guide (700a);
   and a spray unit (900) connected to the suction tube (700) selectively sprays hydrogen water suctioned and guided through the suction tube (700).

2. The portable hydrogen water mist sprayer according to claim 1 wherein,
   the airtightness frame (400) has a gas discharge guide groove (421) extending along a circumference of the sealing member (410) and has a gas discharge guide hole (422) penetrating from one side of the gas discharge guide groove (421) to outside, allowing the gas to be discharged when the internal pressure of the water container (110) exceeds the pre-determined level.

3. The portable hydrogen water mist sprayer according to claim 1 wherein,
   the airtightness frame (400) has an airtightness ring (430), keeping the airtightness frame (400) in close contact with the sealing protrusion (210) of the enclosed installation frame (200), preventing the gas guided into the gas discharge guide groove (421) from entering the open installation space (123).

4. The portable hydrogen water mist sprayer according to claim 1 wherein,
   an O-ring groove (500) is formed by a depression on the enclosed installation frame (200), allowing the O-ring (220) to retract inwardly into the O-ring groove (500) when the internal pressure of the water container (110) exceeds the pre-determined level.

5. The portable hydrogen water mist sprayer according to claim 1 wherein, the battery unit (500) comprises of an external case (510) removably attached to the control unit (300) of the central case (120), an internal case (520) located in the external case (510), a battery (530) located within the internal case (520), and an internal case cover (540) covering the internal case (520).

6. The portable hydrogen water mist sprayer according to claim 5 wherein, the battery (530) is a rechargeable battery.

7. The portable hydrogen water mist sprayer according to claim 5 further comprising, a charging socket (500*a*) to charge the battery (530).

8. The portable hydrogen water mist sprayer according to claim 1, further comprising a bottom cover (110*a*) attached to the water container (110), wherein the bottom cover (110*a*) is made of rubber or silicone.

9. The portable hydrogen water mist sprayer according to claim 1, wherein the electrode guide (800) comprises of an upper electrode guide (810) surrounding the electrodes (610, 620);

a lower electrode guide (820) connected to the tube guide (700*a*), supporting the electrodes (610, 620);

and a lower auxiliary electrode guide (830) protruding from the tube guide (700*a*) and attaching to the upper electrode guide (810), providing support in combination with the lower electrode guide (820).

\* \* \* \* \*